(12) United States Patent
Chien

(10) Patent No.: US 6,385,036 B1
(45) Date of Patent: May 7, 2002

(54) SCREWLESS COMPUTER CASE ASSEMBLY

(76) Inventor: Robert C. Chien, 18461 Railroad St., City of Industry, CA (US) 91748

( * ) Notice: Subject to any disclaimer, the term of this patent is extended or adjusted under 35 U.S.C. 154(b) by 0 days.

(21) Appl. No.: 09/394,009

(22) Filed: Sep. 10, 1999

(51) Int. Cl.7 ................................................ H05K 5/00
(52) U.S. Cl. ..................... 361/683; 361/759; 361/740; 361/801; 361/802; 312/223.1; 312/223.2; 312/222; 312/215
(58) Field of Search ................................ 361/683–686, 361/724–727, 687, 831, 759, 740, 741, 801, 802; 312/223.1, 223.2, 222, 215

(56) References Cited

U.S. PATENT DOCUMENTS

| 1,125,517 A | | 1/1915 | Hagstrom | |
|---|---|---|---|---|
| 4,630,751 A | | 12/1986 | Saito | 220/334 |
| 5,124,885 A | | 6/1992 | Liu | 361/391 |
| 5,145,243 A | | 9/1992 | Liu | 312/265.1 |
| 5,159,528 A | * | 10/1992 | Murphy | 361/683 |
| 5,277,615 A | * | 1/1994 | Hastings et al. | 439/377 |
| 5,398,156 A | * | 3/1995 | Steffes et al. | 361/683 |
| 5,438,476 A | | 8/1995 | Steffes | 361/683 |
| 5,468,060 A | | 11/1995 | Nagai | 312/223.2 |
| 5,491,611 A | | 2/1996 | Stewart et al. | 361/736 |
| 5,524,978 A | | 6/1996 | Tunis et al. | 312/216 |
| 5,593,219 A | | 1/1997 | Ho | 312/263 |
| 5,660,297 A | | 8/1997 | Liu | 220/4.02 |
| 5,682,291 A | | 10/1997 | Jeffries et al. | 361/1.85 |
| 5,697,654 A | | 12/1997 | MacDonald | 292/66 |
| 5,751,545 A | | 5/1998 | Jung | 361/683 |
| 5,785,398 A | | 7/1998 | Park | 312/223.2 |
| 5,793,614 A | * | 8/1998 | Tollbom | 361/732 |
| 5,823,644 A | | 10/1998 | Suh et al. | 312/223.2 |
| 5,913,581 A | | 6/1999 | Stephan et al. | 312/223.2 |
| 5,918,956 A | | 7/1999 | Scholder | 312/223.2 |
| 5,934,772 A | | 8/1999 | Sung | 312/7.2 |
| 6,015,195 A | * | 1/2000 | Anderson et al. | 312/223 |
| 6,099,098 A | * | 8/2000 | Leong | 312/333 |
| 6,157,532 A | * | 12/2000 | Cook et al. | 361/681 |
| 6,181,565 B1 | * | 1/2001 | Schmitt et al. | 361/756 |

* cited by examiner

Primary Examiner—Leo P. Picard
Assistant Examiner—David Foster
(74) Attorney, Agent, or Firm—Philip K. Yu; David J. Arthur

(57) ABSTRACT

A computer case assembly that requires few or no screws for assembly includes a chassis that comprises a frame with side panels forming device bays for computer accessory devices. At least one of the side panels includes substantially parallel horizontal protrusions along the interior surface of the panel. A mounting rail has a screwless attachment for applying the mounting rail to a computer accessory device. The mounting rail is configured to slide between the protrusions of the side panel, and includes a latch to engage the chassis frame members. The chassis also includes a rear panel and a motherboard panel attached to the rear panel. The motherboard panel and the attached rear panel may be moved into a position in which the rear panel is substantially flush with the rear of the chassis. When the rear panel is substantially flush with the rear frame members, a latch affixed to the motherboard panel engages one of the rear frame members. The rear panel includes a plurality of expansion slots, each of which has adjacent to it an opening through the rear panel. An expansion slot filler includes an insertion tab inserted through the opening and having a friction fit with at least one edge of the opening. The latch for the mounting of the rail and the motherboard panel includes a tab extension having a pair of bends to form between the bends an engagement surface. The engagement surface abuts the frame member to hold the device to which the latch is attached in place.

20 Claims, 5 Drawing Sheets

SCREWLESS COMPUTER CASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to casings for personal computers. In particular, the present invention provides for screw-less and tool-less assembly of different elements of the computer case and computer components into the computer case.

2. Background of the Invention

Most personal computers are housed in a casing that comprises a chassis and an outer shell.

The chassis typically is a metal frame on and in which the various computer components and devices are mounted. In particular, the computer chassis may comprise an outer frame. Usually at one end of the frame, the frame is formed into several device bays. Each device bay may be designed to hold a computer device, such as a hard disk drive, a CD-ROM drive, a floppy disk drive, or other computer component. The chassis also has places or brackets for holding a power supply and various boards, including the computer's motherboard. The outer shell protects the computer components from dust and certain other environmental hazards.

The chassis must be held together securely, and the various devices installed in the computer casing must be held securely in place on the chassis. In particular, the devices must remain in place if the computer is accidentally dropped or falls off a support table, or if the computer is tipped over. However, computer users demand that each device remain removable, as many computer users decide after using their computer to upgrade one or more of its components. In addition, the outer shell must be secured to the chassis to ensure it remains in place to perform its protective function.

Presently, computer devices are typically secured to the computer chassis by screws. Openings are provided in the computer chassis frame, typically through the sides of the device bays. Often, these openings are elongated. Many computer frame manufacturers place these openings in standard positions. Device manufacturers provide openings in the sides of the cases for their devices. The positions of these holes are also now standardized, and coincide with the positions of the openings through the computer chassis frame so that screws may be inserted through the frame openings into the openings in the device case. These screws hold the device in place in the device bay.

Thus, a computer device, such as a disk drive, may be inserted into one of the device bays in the computer chassis. Screws are inserted through the openings in the computer chassis and into the openings that are provided in the case of the device for this purpose. Such screws securely attach the device to the chassis. In addition, screws are removable. Therefore, a computer user who wants to remove a device from the computer can remove the screw, and slide the device out of the device bay. However, the need to individually insert each such screw renders initial assembly of a computer time-consuming. This is particularly an issue for a computer assembler seeking to assemble a large number of computers. Also, such screw assembly requires substantial dexterity on the part of the assembly worker to hold the device in place while inserting the screw, and operating the screwdriver.

The computer motherboard is often attached to a vertical motherboard panel of the chassis. In many chassis arrangements, the bottom edge of the motherboard panel is hooked onto a lip at or near the bottom of the computer chassis frame. The motherboard panel can then be tilted in place. The top edge of the panel is attached to the main chassis structure using one or more screws. In other computer case arrangements, the vertical panel to which the motherboard is attached slides into the chassis from the rear of the chassis along a track in the bottom of the chassis. The rear edge of the vertical panel is secured to the chassis frame with screws.

Because of the volume of the personal computer business, there has been a long felt need for a computer chassis that allows for easy and rapid assembly of the different devices into the computer chassis. However, the devices must remain removable so that end users can remove the device if they wish to repair or replace it. In addition, the devices must be securely attached to the chassis. A goal in the computer industry for some time has been to develop a "screw-less" computer chassis, i.e., a chassis that will permit installation of the computer devices, and assembly of the case with few or no screws.

One arrangement to reduce the number of screws used in assembling a computer case is shown in U.S. Pat. No. 5,124,885, issued to Morgan Liu. This reference describes a system in which a bracket is attached to a computer device (such as a disk drive) before the device is installed into the device bay of the computer chassis. This bracket attaches to the chassis without screws. Although the insertion of the device into the device bay is screw-less, the initial installation of the support bracket onto the device requires screws. Therefore, although the described system makes the installation and replacement of devices easy, it does so at the expense of more complicated initial assembly, and additional materials cost for the brackets attached to the computer devices.

Again, there has been a long felt need for a motherboard panel assembly structure that does not require the use of screws to secure the motherboard panel to the chassis frame. One such structure is shown in the above-referenced U.S. Pat. No. 5,124,885. That reference discloses a motherboard mounting plate having a slidable snap-on U shaped fastener. The fastener secures the board to the mounting plate and to the casing's internal frame. In certain circumstances, however, this handle may be hazardous to operators or assemblers. If the operator's hand slips from the handle, the sharp edges of the handle may cut the operator's hand.

Another motherboard mounting system is shown in U.S. Pat. No. 5,145,243 (also issued to Liu). In this reference, a system incorporating a spring loaded latch for securing the motherboard panel to the chassis frame is illustrated. This arrangement makes the assembly of the motherboard panel into the chassis structure simple, but again at the expense of substantial additional components and complexity in the latch structure itself.

SUMMARY OF THE INVENTION

Therefore, it is an object of the present invention to provide a substantially screw-less computer chassis assembly that can be assembled without tools.

It is an object of the present invention to provide a computer chassis that permits computer devices to be inserted into the chassis, and securely attached to the chassis, without screws or tools.

It is an object of the present invention to securely hold computer devices within the computer chassis without screws.

It is an object of the present invention to provide simple, screw-less and tool-less assembly of computer chassis components onto the chassis structure.

It is an object of the present invention to provide simple, screw-less and tool-less assembly of a computer chassis.

The present invention is a computer casing that provides for screw-less and tool-less assembly of a computer into the computer casing using a latching mechanism.

In accordance with the present invention, the computer case includes a chassis that comprises a frame with side panels forming device bays for computer accessory devices. At least one of the side panels includes at least two substantially parallel horizontal protrusions along the interior surface of the panel. A mounting rail has a screwless attachment for applying the mounting rail to a computer accessory device. The mounting rail is configured to slide between the protrusions of the side panel, and includes a latch to engage the chassis frame members. The chassis also includes a rear panel and a motherboard panel attached to the rear panel. The motherboard panel and the attached rear panel may be moved into a position in which the rear panel is substantially flush with the rear of the chassis. When the rear panel is substantially flush with the rear frame members, a latch affixed to the motherboard panel engages one of the rear frame members. The latch for the mounting rail and the motherboard panel includes a latch body adapted for attachment to the motherboard, or to a removable computer component device. The latch also includes a tab extension having a pair of bends to form between the bends an engagement surface. The engagement surface abuts the frame member to hold the device to which the latch is attached in place. The rear panel includes a plurality of expansion slots, each of which has adjacent to it an opening through the rear panel. An expansion slot filler includes an insertion tab inserted through the opening and having a friction fit with at least one edge of the opening.

DETAILED DESCRIPTION OF A PREFERRED EMBODIMENT

As is understood by those skilled in the art, the casing for a personal computer typically includes a metal chassis to which the various devices and components of the computer are attached. The computer case also includes an outer shell that covers the chassis, and encloses the chassis and the components mounted on the chassis. A preferred embodiment of the present invention will be described in connection with a typical "tower" computer case. However, those skilled in the art will recognize that the same principles may be incorporated into other configurations of computer cases.

A computer case incorporating aspects of the present invention is illustrated in FIGS. 1–15. The computer case of the present invention illustrated in FIGS. 1–15 provides the capability of securing computer components into the computer chassis, and securing the outer shell to the computer chassis frame, with few or no screws, for easy assembly.

Figure 1:
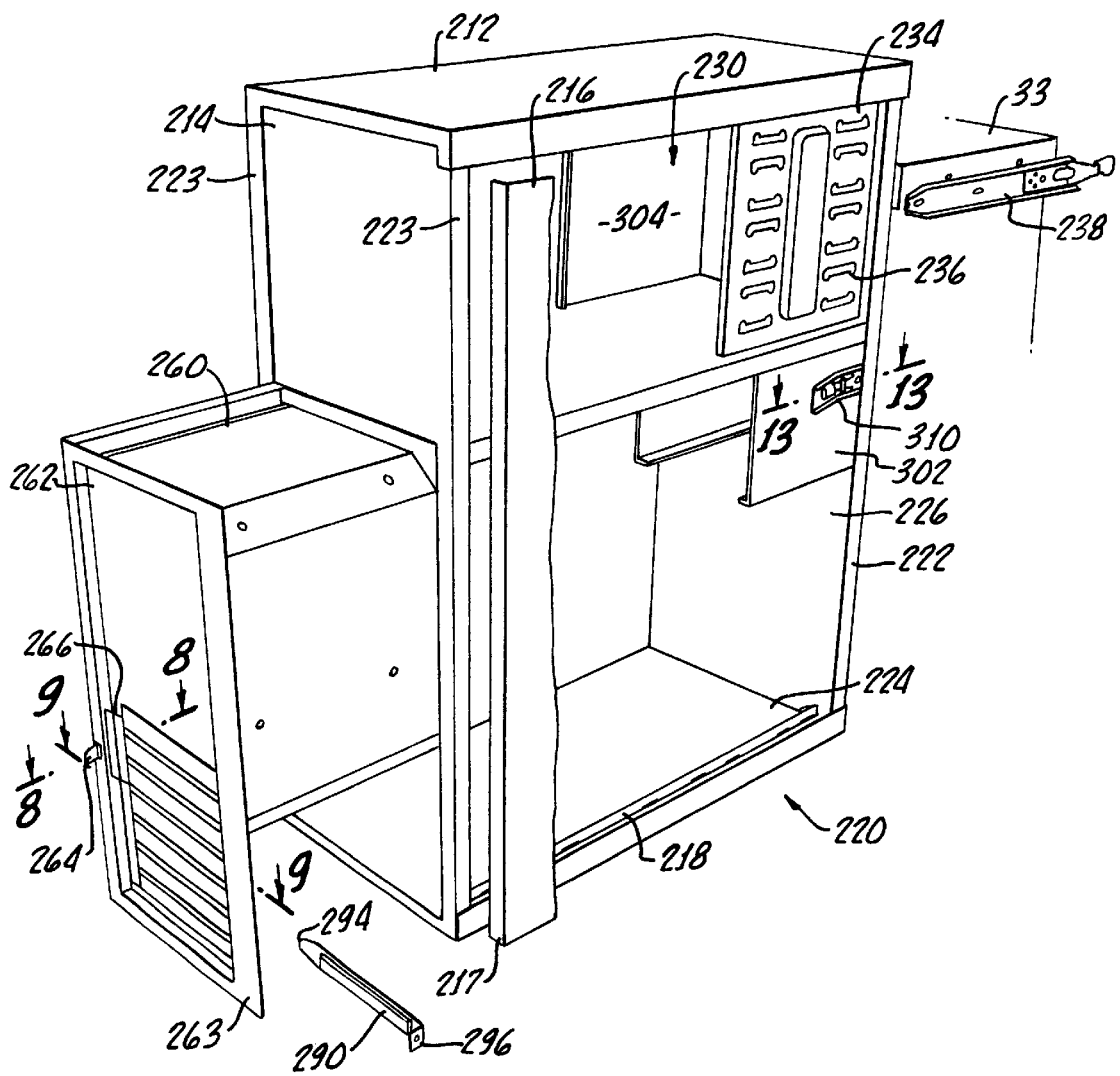
FIG. 1 is a perspective view of a computer case incorporating the present invention, with the view taken from the rear side of the case.

Referring now to FIG. 1, the computer case is designated generally with the reference numeral 220. The computer case 220 includes a frame 222. The frame 222 includes a bottom panel 224 and a front panel 226. The frame 222 further includes vertical rear frame members 223.

A motherboard panel 260 is attached to a back panel 262 of the computer case. The motherboard panel 260 and the rear panel 262 may be welded together or otherwise securely and permanently attached to one another. The motherboard panel 260 and the rear panel 262 are substantially perpendicular one another. The back panel 262 and motherboard panel 260 may be slidably removed from the computer case chassis. Such a slidable arrangement may be provided by a track (not shown) in the bottom panel 224 of the computer case. A parallel track (not shown) may also be provided in an upper portion of the computer case chassis. Such sliding motherboard panels are generally well understood in the art.

When the motherboard panel 260 and the rear panel 262 are positioned fully into the computer case chassis, the side edges of the rear panel 262 are flush against the rear members 223 of the frame 222. In accordance with a particular aspect of the present invention, screwless attachment mechanisms are provided to secure the edges of the motherboard panel 260 and the rear panel 262 against the rear frame members 223. Such screwless attachment mechanisms prevent both the rear panel 262 and the motherboard panel 260 from the exiting the computer case chassis until desired.

One implementation of such a screwless attachment mechanism includes a latch 264 secured to the motherboard panel 260 and the rear panel 262. The latch 264 engages the edge of the rear member of the frame 222 when the motherboard panel 260 and the rear panel 262 are positioned so that the rear panel 262 is flush with the rear members of the frame 222. The latch 264 thereby helps to secure the motherboard panel 260 and the rear panel 262 in place inside the computer case.

Figure 3:
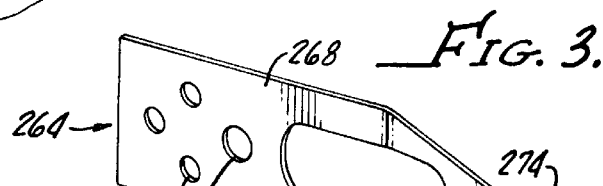
FIG. 3 is a perspective view of a latch forming an aspect of the computer case incorporating the present invention.

An exemplary latch 264 is illustrated in FIG. 3. The latch 264 includes a latch body 268 with a tab extension 270. The latch body 268 is attached to the motherboard panel 260 and/or the rear panel 262. For example, the latch body 268 may be attached to the motherboard panel with rivets 274 (see FIG. 8) through openings 272 in the latch body 268.

The tab extension 270 includes a pair of bends to provide an engagement surface 274 between the bends. The engagement surface 274 permits the tab extension to engage the edge of a portion of the computer chassis frame 222, such as one of the vertical rear frame members 223. Preferably, the bends in the tab extension are each approximately 90 degrees, to enhance the ability of the engagement surface 274 to engage the edge of the rear frame member 223.

The tab extension 270 is preferably formed of an elastic material, such as thin steel, so that the tab extension may be deflected a small amount from its rest position, and when the deflecting force is removed, it returns to its rest position. The tab extension is preferably biased so that when the latch 264 is attached to the motherboard panel, and the motherboard panel 260 is placed in the computer case chassis, the tab extension 270 abuts the edge of the rear chassis frame member 223. As seen more clearly in FIG. 8, the portion of the tab extension 270 between the latch body 268 and the engagement surface 274 is preferably sloped so that as the motherboard panel 260 slides into the computer case chassis, the edge of the rear frame member 223 slides along the sloped surface 276 to press the tab extension 270 inward until the engagement surface 274 slips past the frame member 223. When the engagement surface 274 passes the frame member 223, the extension tab 270 snaps into place, with the finger tab 278 (the outer end of the extension tab 270) abutting the edge of the rear frame member 223. The engagement surface 274 preferably abuts the inner surface of the rear frame member 223.

Should the assembler wish to remove the motherboard panel 260 from the interior of the computer case chassis, the assembler may press the tab extension 270 so that the tab extension is spaced from the edge of the rear frame member 223, and the engagement surface 274 does not abut the rear frame member 223. With the engagement surface 274 disengaged from the rear frame member 223, the motherboard panel 260 is not restrained within the computer case chassis by the latch 264, and the assembler may slide the motherboard panel 260 out of the computer case chassis.

A handle 266 may be provided near the edge of the rear panel 262, on the exterior of the rear panel, to facilitate sliding the rear panel 262 and motherboard panel 260 out of the computer case chassis. For example, the central portion of the rear panel 262 may be slightly recessed, as is conventional in the art. The handle 266 may be secured to the rear panel 262 so that it is substantially parallel to, but spaced from, the recessed portion of the rear panel. Thus, an assembler can insert his or her fingertips into the space between the handle 266 and the recessed portion of the rear panel 262 to pull the rear panel 262 and the motherboard panel 260 out of the computer case chassis.

In the illustrated embodiment, the handle 266 is on the same side of the rear panel 262 as the latch 264, and is relatively near the latch 264. This proximity of the latch 264 and the handle 266 allows the assembler to grasp the latch 264 and the handle 266 with the same hand, facilitating the removal of the rear panel 262 and the motherboard panel 260.

An outer shell for the computer case may be formed of a top panel 212 and one or more side panels 214, 216. At least one of the side panels 216 is preferably removable to provide access to the components within the computer case. For example, the side panel 216 may have prongs or latches (not shown) that interact with receiving openings or prongs 218 at or near the bottom frame panel 224 of the case chassis. Such outer shells and removable panels are generally well understood in the art.

In accordance with an aspect of the present invention, the removable side panel 216 includes a rear lip 217 that extends substantially perpendicular to the primary portion of the side panel 216. The rear lip 217 is thereby configured to wrap around the outer edge of the chassis frame 222, and overlap the edge 263 of the rear panel 262 when the motherboard panel 260 and the rear panel 262 are slid into the case frame so that the motherboard panel 260 is contained within the frame chassis, and the rear panel 262 is flush against the rear frame members 223. When the rear panel 262 is installed flush against the chassis frame members, and the side panel 216 securely in place, the perpendicular edge 217 of the side panel 216 overlaps the side edge 263 of the rear panel 262, to help secure the rear panel 262 in place. Preferably, the edge 263 of the rear panel 262 that is overlapped by the shell is laterally opposite the edge of the rear panel having the latch 264. The latch 264 on one edge of the rear panel 262 and the overlapping edge 217 of the side panel 262 provide securing mechanisms for both sides of the rear panel 262.

The computer chassis frame includes a pair of substantially parallel frame side panels 234. The space 230 between parallel frame side panels 234 constitutes one or more device bays. The parallel frame side panels 234 are spaced apart from one another an appropriate distance so that a computer device 33, with one or more mounting rails 238 attached to the sides thereof, fit between the parallel frame side panels 234.

In accordance with an additional aspect of the present invention, a tool-less and screwless attachment is provided for securing computer accessory devices such as the exemplary computer accessory device 33 into the device bay space. In the particular embodiment illustrated, one or more mounting rails 238 are attached to a side of the computer accessory device 33 without screws or tools. The mounting rail 238 interacts with the vertical side panels 234 of the computer chassis to secure the computer accessory device 33 into the device bay space 230.

At least one of the parallel frame side panels 234 contains a plurality of protrusions 243 (see FIG. 7) formed by punching out openings 236 through the side panel 234. By not completely detaching the metal removed when forming each opening 236, and bending that metal toward the interior of the device bay space 230, inwardly directed protrusions 243 are formed on the inner surfaces of the parallel frame side panels 234. The protrusions 243 are formed so that the protrusions on the same side panel 234 are parallel one another, and spaced apart to receive the mounting rail 238. The mounting rail 238 slides between adjacent sets of the inwardly pointing protrusions 243 formed by the openings 236 in the side panels 234 (see FIG. 7). In a particularly preferred version, the openings 236 are elongate openings, forming elongate protrusions 243.

Figure 2:
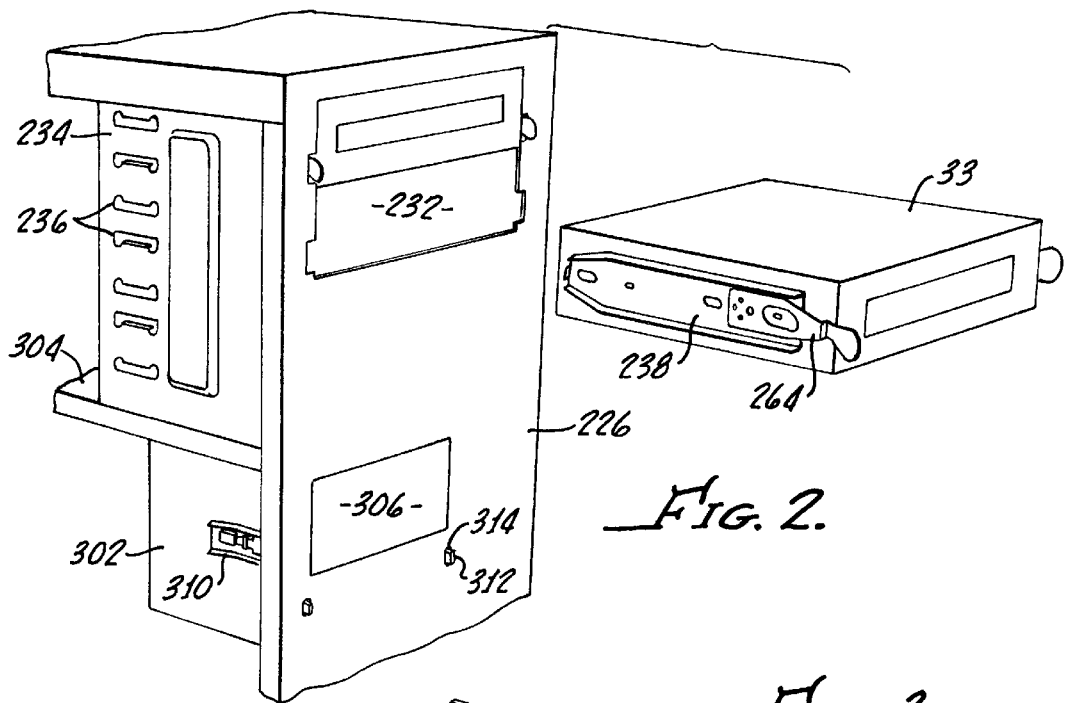
FIG. 2 is a perspective view of a portion of the front and side portions of the computer case incorporating the present invention, and showing a computer accessory device to be inserted into the computer case.

Referring now to FIG. 2, a portion of the front panel 226 of the computer chassis is shown, along with a portion of the side of the chassis. In the illustration, the side panel 216 of the outer shell (see FIG. 1) is removed, revealing the inner frame members of the chassis. One or more openings 232 through the front panel 226 of the chassis frame provide access for insertion of a computer accessory device, such as the device 33, into the device bay space 230 (see FIG. 1). As noted above, the computer accessory device 33 may be a CD drive, a DVD player, a backup storage device, or other computer component.

Figure 4:
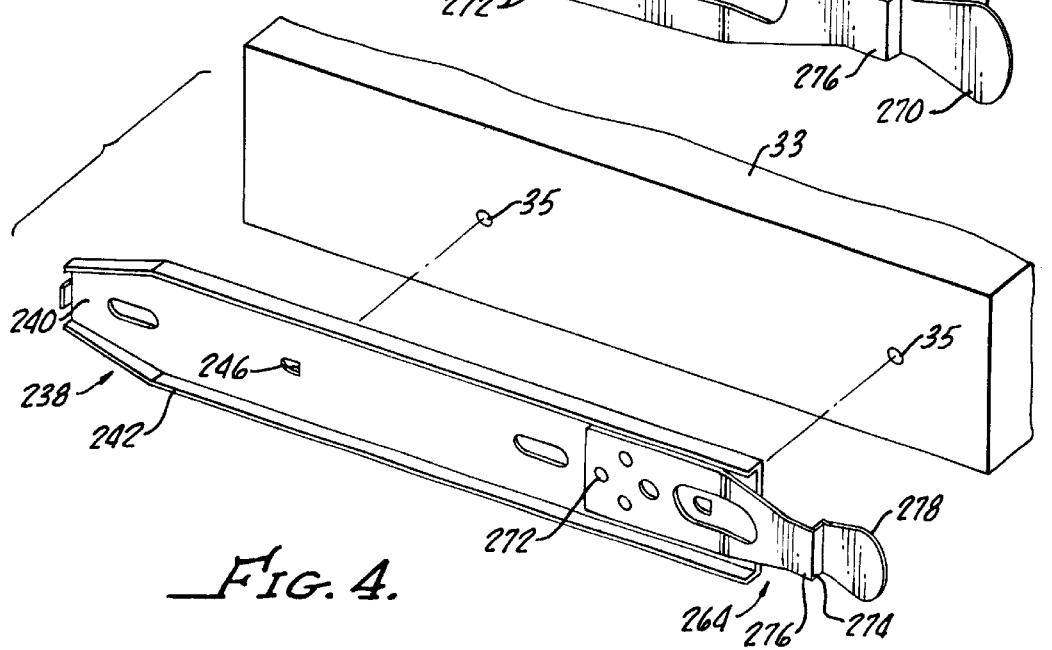
FIG. 4 is a perspective view of a mounting rail constructed in accordance with an aspect of the present invention for securing a computer accessory device into the computer case of the present invention.
Figure 5:
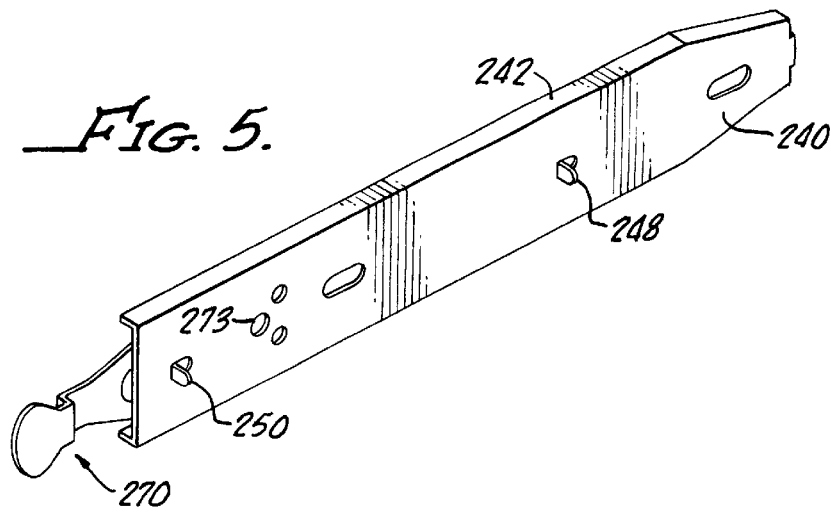
FIG. 5 is an additional perspective view of the mounting rail shown in FIG. 4.

Referring next to FIGS. 4 and 5, the mounting rail 238 and its attachment to an exemplary computer accessory device 33 is illustrated. In the illustrated embodiment, the rail 238 includes a rail body 240 with edges 242 formed along the long sides thereof. For example, the body 240 may be formed of sheet metal, and the edges 242 formed by bending the long sides of the metal forming the body.

Computer accessory devices, such as compact disc (CD) drives, DVD drives, tape drives, other backup storage devices, and other accessories, are typically contained in cases that are of a standard size determined by de facto industry standards. Such device cases typically have threaded screw holes 35 in the sides thereof The threaded screw holes 35 are usually placed in positions determined by de facto industry standards. In conventional computer cases, screws are inserted through side panels of the computer case chassis into the screw holes 35 for securing the computer accessory device 33 into the computer chassis.

In accordance with an aspect of the present invention, tabs 248 and 250 are provided on the mounting rail 238 to engage the threaded screw holes 35 in the computer accessory device 33. The tabs 248, 250 are sized to be approximately the width of the inner diameter of the threads in the screw holes 35, so that the tabs 248, 250 frictionally engage the holes 35 in the device 33.

Figure 6:
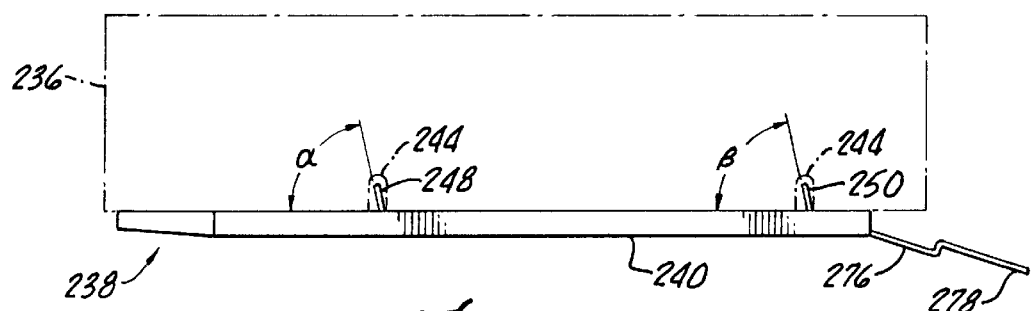
FIG. 6 is a top view of the mounting rail shown in FIG. 5, showing in phantom lines a portion of a computer accessory device.

Referring now to FIG. 6, the mounting rail 238 is shown with the tabs 248, 250. A portion of the computer device 33 is illustrated in phantom lines, to show how the tabs interact with the threaded screw holes 35 in the computer accessory device 33. The tabs 248, 250 may be formed by cutting out a portion of the body 240 of the mounting rail, leaving openings 246 in the rail body 240.

In a particularly preferred embodiment, the tabs 248, 250 project from the body 240 of the mounting rail 238 at slightly different angles with respect to the face of the body 240. For example, the first tab 248 may project at an angle of approximately 80 degrees with respect to the face of the body 240 (the angle designated α in FIG. 6), while the second tab 250 may project at an angle of approximately 85 degrees with respect to the face of the body (the angle designated β in FIG. 6). The different angles for each tab cause the two tabs to engage the respective holes 35 of the computer accessory device slightly differently, which improves the hold of the mounting rail 238 on the device 33.

The improved hold reduces the likelihood that the mounting rail 238 will become detached from the device 33 while the assembler inserts the device and the mounting rail through the opening 232 into the device bay space 230. Once in the device bay space 230, the mounting rail 238 is held against the side of the device 33 and the frame side panels 234.

In the preferred embodiment illustrated, two mounting rails are applied to the device 33, with one mounting rail 238 on either side of the device 33. Those skilled in the art will recognize that computer accessory devices having a greater height may require additional parallel mounting rails, to insure their secure placement in the device bay space 230.

Alternatively, the frame side panels 234 of the computer case chassis may be configured so that one side of the device 33 engages one side panel directly, while the other side of the device has the rail 238 mounted to it to engage the protrusions 243. For example, one side panel may be a conventional side panel through which conventional screws may be inserted to engage the screw holes in the side of the computer accessory device 33 in the conventional manner, while the other side panel may be formed as the innovative side panel 234 illustrated for use with the mounting rails 238. In yet another alternative, screws may be inserted through the openings 242 through the innovative side panels to 324 to engage the screw holes in the computer accessory device 33.

A mounting rail latch 264 is attached to one end of the mounting rail 238. The mounting rail latch 264 engages the edge of the opening 232 through the front panel 226 so that the device 33 cannot slide out of the device bay space 230 until the latch 264 is released. In the illustrated embodiment, the latch 264 on the mounting rail 238 is substantially identical to the latch 264 attached to the motherboard panel 260 (see FIG. 3).

The latch includes a latch body 268 with tab extension 270. Rivets (not shown) may be applied through holes 272 in the latch body 268 and holes 273 in the body 240 of the rail (FIG. 5), to attach the latch 264 to the rail body 240. The tab extension 270 includes a pair of bends to form an engaging surface 274. The tab extension is formed of an elastic material, such as thin steel. The bends in the tab extension permit the engaging surface of the tab extension to engage the edge of the opening 232. Preferably, the bends in the tab extension are each approximately 90 degrees, to enhance the ability of the tab extension to engage the edge of the opening 232.

To install the computer accessory device 33 into the device bay space 230 of the computer case, the mounting rail 238 is applied to the side of the computer accessory device. The mounting rail is applied to the computer accessory device 33 by inserting the tabs 248, 250 of the mounting rail 238 into the holes 35 in the sides of the computer accessory device. The computer accessory device 33 with the mounting rails 238 is then positioned through the opening 232 in the front panel 226 of the computer case frame so that the mounting rail 238 is aligned between adjacent inward protrusions 243 of each frame side panel 234.

Figure 7:
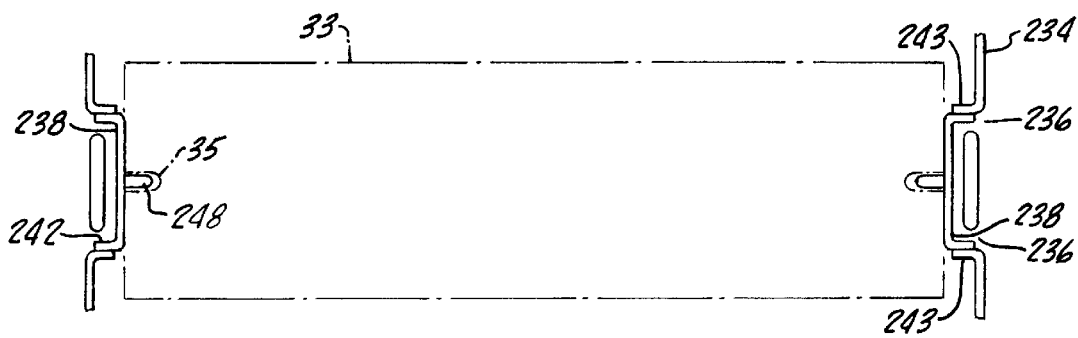
FIG. 7 is a cross sectional view of a computer accessory device bay space in the computer case of the present invention, showing a computer accessory device installed with the mounting rail that is incorporated in an aspect of the present invention.

As seen in FIG. 7, the edges 242 of the mounting rail slidably engage the inward projections 243 of the frame side panels 234. The spacing between the protrusions 243 on the opposite side panels 234 is only slightly larger or greater than the width of the computer accessory device 33. In addition, the tabs 248, 250 are longer than the difference in the spacing between the opposite projections 243. Thus, once inserted into the device bay space 230 using the mounting rails 238, the mounting rails remain secured to the computer accessory device 33, so that the computer accessory device is held within the device bay space 230.

Those familiar with the art will recognize that the rear panel of a computer case typically includes horizontal elongated openings or slots into which additional computer component may be inserted. These slots are conventionally called expansion slots. Until and unless a computer component is installed in a particular slot, an expansion slot filler is placed in the slot to reduce the entry of foreign debris into the interior of the computer case. In accordance with an aspect of the screwless and tool-less computer case of the present invention, an expansion slot filler 290 (see FIG. 1) is provided in the rear panel 262, which expansion slot filler 290 may be removed from the rear panel 262 without the use of tools.

Figure 9:
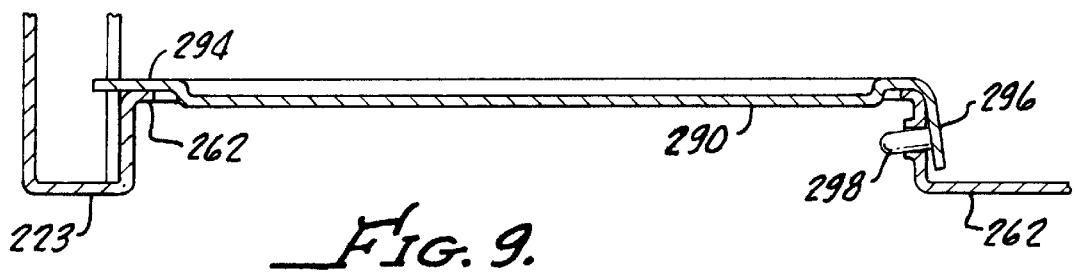
FIG. 9 is a cross-sectional view of the rear panel of the computer case incorporating the present invention, illustrating expansion slot fillers incorporating an aspect of the present invention, the view taken along line 9—9 of FIG. 1.
Figure 10:
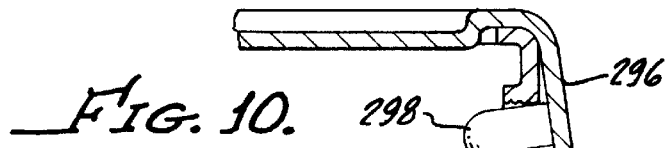
FIG. 10 is a cross-sectional view illustrating in greater detailed an aspect of the expansion slot fillers illustrated in FIG. 9.

The expansion slot filler 290 is seen in greater detail in FIGS. 25 and 26. Referring, for example, to FIG. 9, the filler 290, at one end thereof, includes a first tab 294 that frictionally fits against the edge of the rear panel 262 and through an opening in the rear frame member 223 of the computer case. At the second end of the expansion slot filler 290, a second tab 296 is bent relative to the main body of the filler, to form an angle of 90 degrees, or preferably somewhat more than 90 degrees. An insertion tab 298 extends from the second tab 296, perpendicular to the second tab 296. The insertion tab 298 frictionally engages a threaded opening 288 in the rear panel 262 of the computer case. Those familiar with the art will recognize that threaded openings such as the opening 288 are conventionally included in the rear panel of computer cases for the purpose of receiving screws that are conventionally used for securing a conventional expansion slot filler to the rear panel. If the second tab 296 of the expansion slot filler 290 is angled with respect to the main body of the expansion slot filler 290 at an angle slightly greater than 90 degrees, the edge of the insertion tab 298 that is nearest the end of the second tab 296 tends to press against one side of the threaded opening 288, to hold the expansion slot filler 290 in place. In addition, the insertion tab 298 may be sloped so that it is wider where it joins the second tab 296, and narrower towards its free end, so that be farther the insertion tab 298 is inserted into and through the threaded opening 288, the greater the friction between the insertion tab 298 and the threaded opening 288. Pressure on the end of the first tab 294 releases the expansion slot filler 290 from the expansion slot opening.

Additional computer accessory devices or computer components, such as 3½ in. storage devices, may be contained in a device cage 302 and inserted into the case. The device cage 302 is attached to the computer case frame using a latch 310. The basic construction of the device cage 302 will be well understood by those familiar with the art. In particular, the device cage 302 may include along its upper surface or side hooks or slots (not shown) to interact with corresponding hooks or slots in the horizontal surface 304 of the computer case frame. As is also conventional in the art, an opening 306 through the front panel of the computer case 226 provides access to the device or devices contained in the device cage 302.

In accordance with an aspect of the present invention, the device cage 302 is secured to the computer case frame without the use of screws by using a device cage latch 310. In addition, tabs 312 on the front side of the cage device cage 302 project through openings 314 in the front panel 226 of the computer case.

Figure 11:
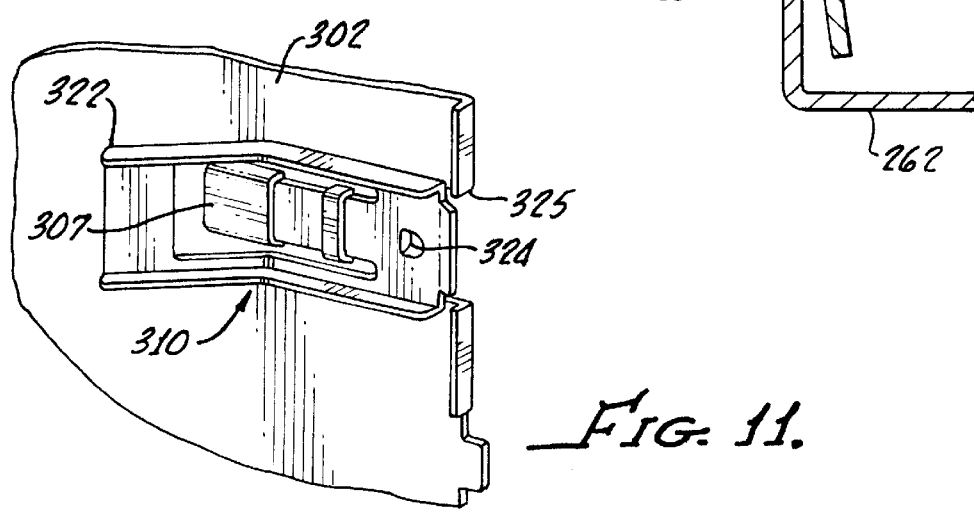
FIG. 11 is a perspective view of a latch for securing a device holder into the computer case incorporating the present invention.
Figure 12:
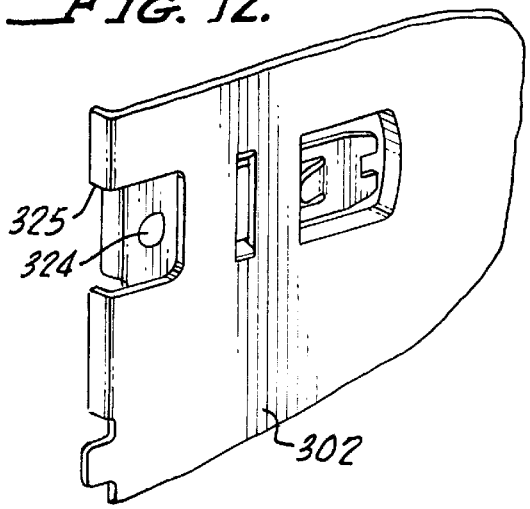
FIG. 12 is a second perspective view of the latch illustrated in FIG. 11.

The device cage latch 310 is shown in greater detail in FIGS. 27, 28, and 29. Referring the first to FIG. 11, the latch 310 comprises a latch body 322 having at one end thereof a latch projection 324. A cut out portion 325 of the device cage 302 allows the latch projection 324 to project beyond the interior surface of the device cage 302. Referring next to FIGS. 28 and 29; a case projection 326 on the interior surface of the front panel 226 of the computer case extends perpendicular to the front panel of the computer case. An opening 328 through the case projection 326 receives the latch projection 324 when the device cage 302 is secured to the computer case. The rear edge of the latch projection 324 is preferably substantially perpendicular to the latch body 322 so that it securely abuts the edge of the opening 328 to hold the device cage 302 in place. The front edge of the latch projection 324 is preferably sloped so that as be device cage 302 is positioned into the computer case, the latch projection 324 slides over the case projection 326 until the device latch projection 324 snaps into the opening 328.

Figure 13:
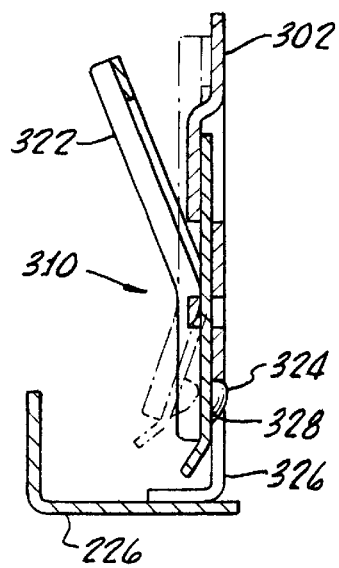
FIG. 13 is a cross-sectional view of the latch shown in FIGS. 27 and 28, the view taken along line 13—13 of FIG. 1.

The latch body 322 is preferably angled so that the assembler may depress the end remote from the latch projection 324 and release the latch projection 324 from the opening 328. For example, the latch body 322 may be formed of a somewhat springy material, with a portion of the latch body secured to the device cage 302. With further particularity, a portion of the latch body 322 may be inserted into or through loops 306 on the exterior surface of the device cage 302. This allows the latch 310 to be toggled between the two positions illustrated in FIG. 13. Referring to FIG. 13, the latch 310 is shown in solid lines with the latch projection 324 inserted through the opening 328. The latch 310 is also shown in phantom lines positioned to withdraw the latch projection 324 from the opening 329, thus releasing the device cage 302 from the computer case frame. Preferably, the latch 310 is biased to the position in which the latch projection 324 projects through the opening 328.

In addition to, or instead of, the latch 310 on the side of the device cage 302, a latch 350 may be provided at the top of the device cage 302, as shown in FIG. 1–5. In the particular embodiment illustrated in FIG. 15, an opening 352 is provided through the front panel 226 of the computer case, just above the primary device opening 306. When the device cage 302 is installed in position in the chassis, a portion of the latch 350 may protrude through the opening 352, engaging the exterior surface of the front panel 226 at the edge of the opening 352. For example, the latch 350 may include a protrusion 354 cut from the body of the latch 350 forming a "one way" tab. Alternatively, the end of the latch 350 may be curved upward to form a hook that engages the front panel 226 when the end of the latch 350 is pushed through the opening 352. Thus, the latch 350 may be a simple piece of spring steel securely attached to the surface of the device cage 302. In the illustrated embodiment, the latches attached to the interior surface of the device cage, so that it does not obstruct be maintained of the upper surface of the device cage with the underside of the frame member 304. In the configuration illustrated in big 31, the upper surface of the device cage may also contain hooks (not shown) that interact with hooks on the underside of the frame member 304. Those skilled in the art will recognize that more elaborate latches may be used in lieu of the simple latch 350. For example, a latch such as the latch 264 illustrated in FIG. 3 may be attached to the device cage 302. Alternatively, a latch such as the latch or similar to the latch 310 (and shown in FIGS. 11–13) may be used. If a latch similar to the latch 310 is used, the latch may interact with the edge of the opening 352. Or, a protrusion may be provided on the interior surface of the front panel 226, and the latch interact with the protrusion in the same manner that the latch 310 interacts with the protrusion 326.

In accordance with an additional aspect of the present invention, a unique standoff attachment securely attaches the motherboard to the motherboard panel 260. However, the motherboard may, if desired, also be removed from the motherboard panel, without the use of tools. When the motherboard is removed from the standoff attachment, the standoff attachment remains attached to the motherboard panel 260. An exemplary standoff attachment is illustrated in FIG. 8.

Figure 8:
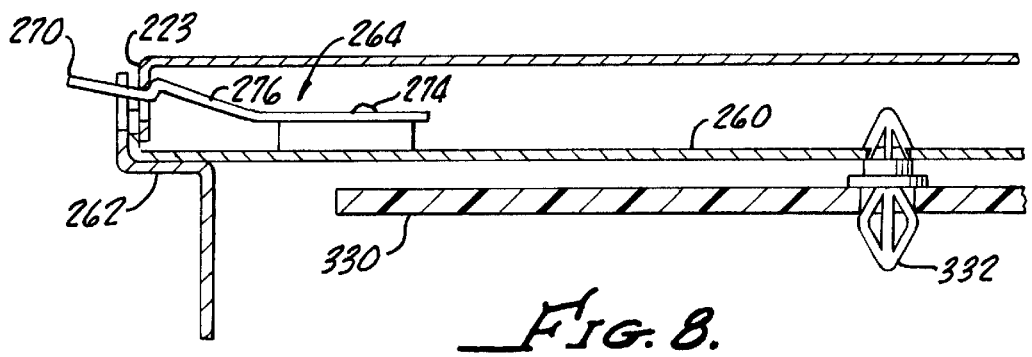
FIG. 8 is a cross-sectional view of the motherboard panel of the computer case incorporating the present invention, illustrating a motherboard attachment device constructed in accordance with an aspect of the present invention, the view taken along line 8—8 of FIG. 1.

Referring to FIG. 8, an exemplary motherboard 330 is shown attached to the motherboard panel 260 by a standoff attachment 332. The standoff attachment is illustrated in greater detail in FIGS. 30 and 31. As those skilled in the art will recognize, it is generally required that printed circuit boards, such as computer motherboards, be physically spaced from the plates or panels to which they are mounted. The standoff attachment 332 may be formed either of an insulating material such as plastic, or of a conductive material such as metal. An insulating standoff attachment may be used when there is to be no electrical contact between the particular portion of the circuitry on the motherboard 330 and the motherboard panel 260. A metal or electrically conductive standoff attachment may be used if electrical contact between the motherboard 330 and the motherboard panel 260 is to be provided. For example, it may be desirable to provide electrical contact between a portion of the circuitry on the motherboard 330 and the electrical grounding provided by the motherboard panel 260.

Figure 14:
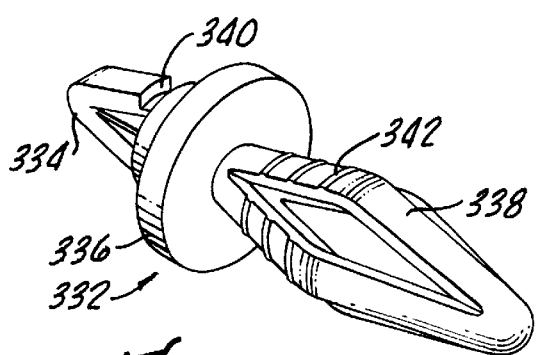
FIG. 14 is a perspective view of the motherboard attachment device comprising an aspect of the present invention.
Figure 15:
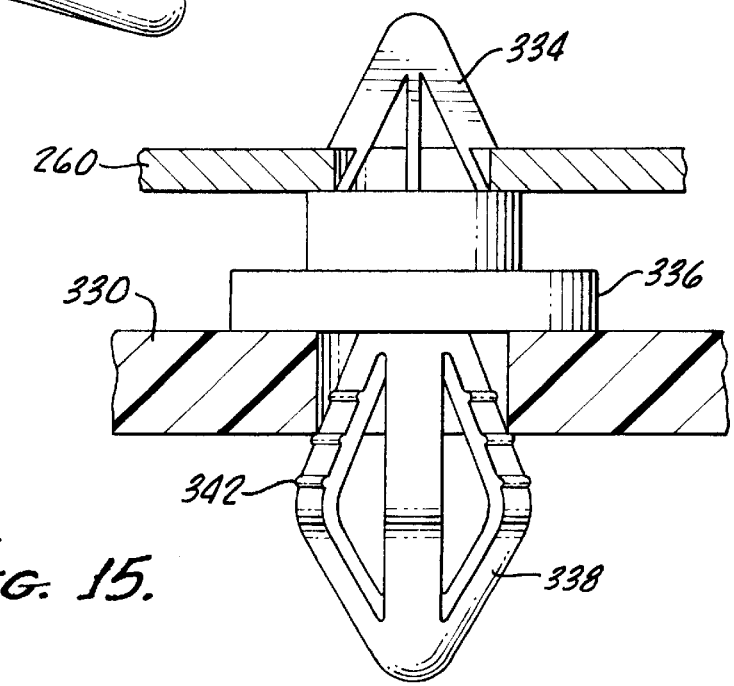
FIG. 15 is a cross-sectional view of the motherboard attachment panel, showing a motherboard attached with the attachment device illustrated in FIG. 14.

Referring now to FIGS. 14 and 15, the standoff attachment 332 includes a one-way panel attachment 334, a spacer section 336, and a board attachment 338.

The one-way panel attachment 334 includes notched prongs that may be pressed through an opening in the motherboard panel 260. Notches 340 on the prongs then engage the opposite side of the motherboard panel 260 to secure the standoff attachment 332 to be motherboard panel 260. The spacing of the notches between the end of the prongs and the spacer section 336 should be approximately equal to the thickness of the motherboard panel 260. Once the one-way attachment 334 is inserted through an opening in the motherboard panel, it is difficult to remove the standoff attachment from the motherboard panel. Although the illustrated embodiment includes two prongs, those skilled in the art will recognize that embodiments with three, four, or more prongs may also be used.

Those skilled in the art will recognize that current board mounting panels similar to the motherboard panel 260 may have threaded screw holes (not shown) for receiving conventional threaded attachments for securing the circuit boards to their mounting panels. The one-way attachment 334 shown in FIGS. 14 and 15 may be sized to fit through such threaded openings. Alternatively to the one-way attachment 334, a threaded end (not shown) to the standoff attachment 332 may be provided for engaging the threads of such threaded openings so that the standoff attachment may be screwed onto the motherboard panel 260.

In a particular embodiment of the standoff attachment illustrated, the spacer section 336 is substantially cylindrical. As further particularly illustrated, the spacer section 336 includes two portions along the longitudinal axis of the standoff attachment, one of which is larger in diameter than the other. The smaller diameter section is adjacent the motherboard panel. As will be apparent to those familiar with the art, the portion of the spacer section 336 adjacent the motherboard panel is larger than the opening through the motherboard panel that admits the one-way attachment 334.

The standoff attachment further includes a board attachment section 338 on the end of the standoff attachment opposite the one-way attachment 334. The board attachment section 338 includes a hollow core surrounded by two or more vertical members. The particular embodiment illustrated includes four such vertical members. The vertical members are each attached to the spacer section 336. In addition, the vertical members are attached to one another at their ends remote from the spacer section. Between the spacer section and the remote end, the vertical members are preferably curved so that the board attachment section 338 has a convex shape. For example, as illustrated, the vertical members may slope outward nearer the spacer section 336, and slope inward toward their remote ends. The vertical members preferably flex so that the board attachment section 338 can fit in either direction through an opening in the motherboard 330. The maximum horizontal dimension of the board attachment section 338 is slightly greater than the diameter of the opening in the motherboard through which the board attachment section is to fit. Those skilled in the art will recognize that the board attachment section 338 may include two, three, four, or more vertical members.

To facilitate holding the board against the spacer section 336, horizontal ribs 342 may be provided on the outer surface of each of the vertical members. In the illustrated embodiment, the horizontal ribs 342 are only on the portions of the inwardly sloping portions of the vertical members that are nearer to the spacer portion 336.

Those skilled in the art will recognize that standoff attachment devices such as the illustrated standoff attachment 332 may also be used to attach other types of boards to other types of plates or panels, for example, in other portions of the computer case.

I claim:

1. A computer chassis comprising:

a front panel having one or more openings through it;

two side panels adjacent the opening through the front panel, wherein each of the side panels is substantially orthogonal to the front panel, and the side panels are substantially parallel one another to define between them a device space, wherein at least one of the side panels includes at least two substantially parallel horizontal protrusions along the interior surface of the panel;

a mounting rail having a screwless attachment for applying the mounting rail to a computer accessory device, wherein the mounting rail is configured to slidably engage the substantially parallel protrusions of the side panel;

rear frame members;

a rear panel;

a motherboard panel attached to the rear panel, wherein the motherboard panel and the rear panel are oriented substantially perpendicular one another, and wherein the motherboard panel and the attached rear panel may be moved into a position in which the rear panel is substantially flush with the rear of the chassis;

a latch affixed to the motherboard panel for engaging one of the rear frame members when the motherboard panel and rear panel are positioned so that the rear panel is substantially flush with the rear of the chassis.

2. The computer case of claim 1, wherein the mounting rail additionally includes a latch, wherein the mounting rail latch engages an edge of one of the openings through the front panel of the computer chassis when the mounting rail is between the parallel protrusions of the side panels.

3. The computer case of claim 2, wherein the screwless attachment for applying the mounting rail to a computer accessory device comprises first and second tabs, each of the tabs is oriented at an angle with respect to the body of the mounting rail.

4. The computer case of claim 3, wherein the first and second tabs on the mounting rail are oriented at different angles with respect to the body of the mounting rail.

5. The computer case of claim 1, additionally comprising a computer device cage comprising a plurality of cage panels, and a device cage latch attached to at least one pane of the cage for interacting with a panel of the case.

6. The computer case of claim 5, wherein the front panel of the frame additionally includes a projection from the interior surface thereof, and the device cage latch interacts with the projection from the interior surface of the front panel of the frame.

7. The computer case of claim 1, wherein the latch affixed to the motherboard is adjacent one edge of the rear panel, and wherein an edge portion of at least one of the shell panels overlaps the opposite edge of the rear panel when the rear panel is substantially flush with the rear of the chassis each of the first and second rear lips of the shell includes a cutout positioned so that when the shell is fitted over the chassis the first and second latches on the rear panel of chassis fit within the cutouts.

8. The computer case of claim 7, additionally comprising a handle secured to the rear panel adjacent the latch.

9. The computer chassis of claim 1, additionally comprising a shell having two side panels and a top panel, wherein:
   the shell fits over the chassis so that the side panels of the shell cover the side panels of the chassis; and
   one side panel of the shell includes a lip extending substantially orthogonal to the side panel, to overlap a portion of the rear panel of the chassis when the motherboard panel and rear panel are positioned so that the rear panel is substantially flush with the rear of the chassis.

10. A computer case comprising:
   a frame forming a device bay having first and second substantially parallel side panels defining a space between them, wherein at least one of the side panels has a pair of substantially parallel protrusions along the interior surface of the panel;
   mounting rail having a screwless attachment for applying the mounting rail to a computer accessory device, wherein the mounting rail is configured to slidably engage the substantially parallel protrusions of the side panel;
   a mounting rail latch attached to the mounting rail, wherein the mounting rail latch engages the edge of one of the openings through the front panel of the computer chassis when the mounting rail is between the parallel protrusions of the side panels.

11. The computer case of claim 10, wherein the screwless attachment for applying the mounting rail to a computer accessory device comprises first and second tabs, each of the tabs is oriented at an angle with respect to the body of the mounting rail.

12. The computer case of claim 11, wherein the first and second tabs are oriented at different angles with respect to the body of the mounting rail.

13. The computer case of claim 12, wherein the computer case includes a chassis comprising frame members, and the mounting rail latch comprises a latch body including a tab extension, wherein the tab extension includes a pair of bends providing an engagement service between them to permit the tab extension to engage the edge of one of the chassis frame members.

14. A computer chassis comprising:
   rear frame members;
   a rear panel;
   a motherboard panel attached to the rear panel, wherein the motherboard panel and the rear panel are oriented substantially perpendicular one another, and wherein the motherboard panel and the attached rear panel may be moved from a position in which the rear panel is substantially flush with the rear of the chassis to a position in which the rear panel is removed from the chassis;
   a latch affixed to the motherboard panel for engaging one of the rear frame members when the motherboard panel and rear panel are positioned so that the rear panel is substantially flush with the rear of the chassis.

15. The computer case of claim 14, wherein the latch affixed to the motherboard is adjacent one edge of the rear panel, and wherein an edge portion of at least one of the shell panels overlaps the opposite edge of the rear panel when the rear panel is substantially flush with the rear of the chassis.

16. The computer case of claim 15, wherein the latch affixed to the motherboard comprises a latch body including a tab extension, wherein the tab extension includes a pair of bends providing an engagement service between them to permit the tab extension to engage the edge of a portion of the rear frame members.

17. The computer case of claim 16, additionally comprising a handle secured to the rear panel adjacent the latch.

18. The computer chassis of claim 14, additionally comprising a shell having two side panels, and a top panel, wherein:
   the shell fits over the chassis so that the side panels of the shell cover the side panels of the chassis; and
   one side panel of the shell includes a lip extending substantially orthogonal to the side panel, to overlap a portion of the rear panel of the chassis when the motherboard panel and rear panel are positioned so that the rear panel is substantially flush with the rear of the chassis.

19. A computer chassis having one or more places to receive removable computer components, the chassis comprising a latch for securing a first removable computer component into one of the places, the latch comprising:
   a latch body adapted for attachment to the first removable computer component; and
   a tab extension from the latch body, wherein a portion of the tab extension forms an engagement surface substantially perpendicular to the remaining portions of the tab extension.

20. The computer case of claim 19, wherein the tab extension includes a pair of bends, each of approximately ninety degrees, with the engagement surface between the bends.

* * * * *